(12) United States Patent
Hirata et al.

(10) Patent No.: US 8,936,692 B2
(45) Date of Patent: Jan. 20, 2015

(54) OPTICAL FUNCTIONAL FILM, AND METHOD FOR MANUFACTURING LIQUID CRYSTAL DISPLAY DEVICE USING SAME

(75) Inventors: Satoshi Hirata, Ibaraki (JP); Kazuo Kitada, Ibaraki (JP); Tomokazu Yura, Ibaraki (JP); Satoru Koshio, Ibaraki (JP); Takuya Nakazono, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 0 days.

(21) Appl. No.: 13/813,286

(22) PCT Filed: Aug. 23, 2011

(86) PCT No.: PCT/JP2011/068959
§ 371 (c)(1),
(2), (4) Date: Jan. 30, 2013

(87) PCT Pub. No.: WO2012/029592
PCT Pub. Date: Mar. 8, 2012

(65) Prior Publication Data
US 2013/0126080 A1 May 23, 2013

(30) Foreign Application Priority Data

Sep. 1, 2010 (JP) ................. 2010-195960

(51) Int. Cl.
*B32B 7/06* (2006.01)
*B32B 37/00* (2006.01)
(Continued)

(52) U.S. Cl.
CPC ............. *B32B 7/06* (2013.01); *B32B 37/003* (2013.01); *G02F 1/1303* (2013.01); *B32B 2307/40* (2013.01); *B32B 2457/202* (2013.01); *A32B 38/0004* (2013.01); *G02F 1/133528* (2013.01)
USPC ........... 156/248; 156/247; 156/249; 156/250; 428/40.1

(58) Field of Classification Search
CPC .. B32B 2457/202; B32B 7/12; B32B 37/003; B32B 7/06; B32B 38/0004; B32B 2307/40; B32B 2457/002; G02F 1/1303; G02F 1/133528
USPC ........... 156/248, 60, 247, 249, 250, 257, 540; 428/40.1, 41.8, 354
See application file for complete search history.

(56) References Cited

U.S. PATENT DOCUMENTS

2005/0016670 A1   1/2005   Kanbara et al.
2006/0124248 A1   6/2006   Kanbara et al.
(Continued)

FOREIGN PATENT DOCUMENTS
JP   2005-037416 A   2/2005
(Continued)

OTHER PUBLICATIONS
International Search Report for PCT/JP2011/068959, mailing date of Nov. 29, 2011.
(Continued)

*Primary Examiner* — Margaret Squalls
(74) *Attorney, Agent, or Firm* — Westerman, Hattori, Daniels & Adrian, LLP (57) ABSTRACT

Provided is an optical functional film in which air bubbles can be effectively prevented from forming during lamination, and preferably in which a carrier film does not tear readily. Also provided is a method for manufacturing a liquid crystal display device using this optical functional film. A belt-shaped optical functional film is used in order to cut away the optical functional film at predetermined intervals from the belt-shaped optical functional film to which a carrier film is bonded, with the carrier film remaining uncut; to subsequently turn over the carrier film by an edge-shaped member and peel away the optical functional film; and to laminate the exposed surface of the optical functional film to a sheet member while the optical functional film is being peeled away, wherein the optical functional film is characterized in that the flexural rigidity of the carrier film per unit length in the longitudinal direction is from $5.0 \times 10^{-5}$ N·mm$^2$ to $8.0 \times 10^{-2}$ N·mm$^2$, and the longitudinal modulus in the longitudinal direction is from 3000 MPa to 5000 MPa.

2 Claims, 5 Drawing Sheets

(51) Int. Cl.
*G02F 1/13* (2006.01)
*G02F 1/1335* (2006.01)

(56) References Cited

U.S. PATENT DOCUMENTS

| 2007/0104961 A1 | 5/2007 | Awaji et al. |
| 2008/0032070 A1 | 2/2008 | Hirschfelder et al. |
| 2009/0199950 A1 | 8/2009 | Kitada et al. |
| 2009/0218049 A1 | 9/2009 | Kanbara et al. |
| 2009/0252932 A1 | 10/2009 | Kitano et al. |
| 2010/0288441 A1 | 11/2010 | Kitada et al. |

FOREIGN PATENT DOCUMENTS

| JP | 2008-96499 A | 4/2008 |
| JP | 2008-510638 A | 4/2008 |
| JP | 2008-149537 A | 7/2008 |
| JP | 2009-157363 A | 7/2009 |
| JP | 2010-115818 A | 5/2010 |
| WO | 2006/064884 A1 | 6/2006 |
| WO | 2008/047712 A1 | 4/2008 |

OTHER PUBLICATIONS

Translation of the International Preliminary Report on Patentability (PCT/ISA/237) (5 pages), (PCT/IB/373) (1 page) of International Application No. PCT/JP2011/068959 mailed Mar. 21, 2013 (Form PCT/IB/338) (1 page).

Notice of Allowance dated Jul. 31, 2013, issued in corresponding Taiwanese Patent Application No. 100130960, w/English translation.

Chinese Office Action dated Sep. 3, 2014, issued in corresponding Chinese Application No. 201180032333.7; w/ English translation (14 pages).

OPTICAL FUNCTIONAL FILM, AND METHOD FOR MANUFACTURING LIQUID CRYSTAL DISPLAY DEVICE USING SAME

TECHNICAL FIELD

The invention relates to an optical functional film that includes a belt-shaped optical functional film and a carrier film bonded thereto and is for use in a process including cutting the belt-shaped optical functional film at predetermined intervals while leaving the carrier film uncut, then peeling off the cut piece of the optical functional film from the carrier film by turning the direction of the feeding of the carrier film by means of an edge member, and bonding the exposed surface of the cut piece of the optical functional film to a flat piece member while peeling off the cut piece of the optical functional film. The invention also relates to a method for manufacturing an optical display device using such an optical functional film.

BACKGROUND ART

In the conventional art, to deliver optical functional films to liquid crystal display device manufacturers, optical functional film manufactures perform a process including providing a roll of a flat piece member, stamping the sheet into pieces of a predetermined size, then packing a stack of several pieces of the sheet, and delivering the packed products. Unfortunately, this process has problems such as long process time, a lot of necessary packing materials, and complicated unpacking process.

Thus, there is disclosed a manufacturing method that is performed in a series of steps including providing a continuous roll of a belt-shaped material including an optical functional film, which is delivered to a liquid crystal display device manufacturer, feeding the material from the roll, inspecting the material for defects, cutting the material, and bonding the cut piece of the material to a liquid crystal display device (see for example Patent Document 1).

For example, this manufacturing method is performed using a process including cutting the belt-shaped optical functional film at predetermined intervals while leaving a carrier film uncut (what is called half-cutting), wherein the carrier film adheres to the belt-shaped optical functional film, and then peeling off the cut piece of the optical functional film from the carrier film by turning the direction of the feeding of the carrier film by means of an edge member, while allowing the cut piece of the optical functional film and a liquid crystal panel to pass between rollers to bond the exposed surface of the cut piece of the optical functional film to the liquid crystal panel.

PRIOR ART DOCUMENT

Patent Document

Patent Document 1: WO 2008/047712 A

SUMMARY OF THE INVENTION

Problems to be Solved by the Invention

Unfortunately, the above bonding method has a problem in that in the process of bonding the optical functional film to the liquid crystal panel by allowing them to pass between rollers, bubbles can be easily formed at the interface between them to cause a defect in the product. Thus, it has been desired to establish a technique in which bonding can be performed without forming bubbles.

In the process of half-cutting, the carrier film is also accidentally cut or notched, so that the carrier film may begin to break from the notched portion due to the tension during feeding. These accidents cause problems such as a reduction in product yield and a reduction in production efficiency.

It is thus an object of the invention to provide an optical functional film that can effectively prevent bubbles from being formed in the bonding process, and, preferably, is less likely to cause a carrier film to break, and to provide a method for manufacturing a liquid crystal display device using such same.

Means for Solving the Problems

As a result of earnest studies to solve the problems, the inventors have unraveled the mechanism of bubble formation. Based on the information, the inventors have accomplished the invention by finding that the object can be achieved when the bending rigidity of the carrier film per unit length in the longitudinal direction falls within the specified range and when the longitudinal elastic modulus of the carrier film in the longitudinal direction also falls within the specified range.

Namely, an optical functional film of the present invention comprises:

a belt-shaped optical functional film; and a carrier film bonded to the belt-shaped optical functional film, the optical functional film being for use in a process that includes cutting the belt-shaped optical functional film at a predetermined interval while leaving the carrier film uncut, then peeling off a cut piece of the optical functional film from the carrier film by turning the direction of feeding of the carrier film by means of an edge member, and bonding an exposed surface of the cut piece of the optical functional film to a flat piece member while peeling off the cut piece of the optical functional film, wherein the carrier film has a bending rigidity of from $5.0 \times 10^{-5}$ $N \cdot mm^2$ to $8.0 \times 10^{-2}$ $N \cdot mm^2$ per unit length in its longitudinal direction and has a longitudinal elastic modulus of from 3,000 MPa to 5,000 MPa in its longitudinal direction, wherein the bending rigidity per unit length is expressed by the product $E \times I$, wherein E represents the longitudinal elastic modulus $[N/mm^2]$ of the optical functional film, and I represents the second moment of area per unit length expressed by $I = b \times h^3 / 12$, wherein b represents unit length (1 mm), and h represents film thickness (mm).

Herein, the bending rigidity per unit length is expressed by the product $E \times I$, wherein E represents the longitudinal elastic modulus $[N/mm^2]$ of the optical functional film, and I represents the second moment of area per unit length expressed by $I = b \times h^3 / 12$, wherein b represents unit length (1 mm), and h represents film thickness (mm). More specifically, the values of the physical properties are determined by the method described in the examples.

In the optical functional film of the invention, the bending rigidity per unit length and the longitudinal elastic modulus of the carrier film in the longitudinal direction each falls within the specified range. Thus, using the optical functional film of the invention, bubbles are effectively prevented from being formed in the bonding process. The inventors suggest the following mechanism of bubble formation.

Figure 5:
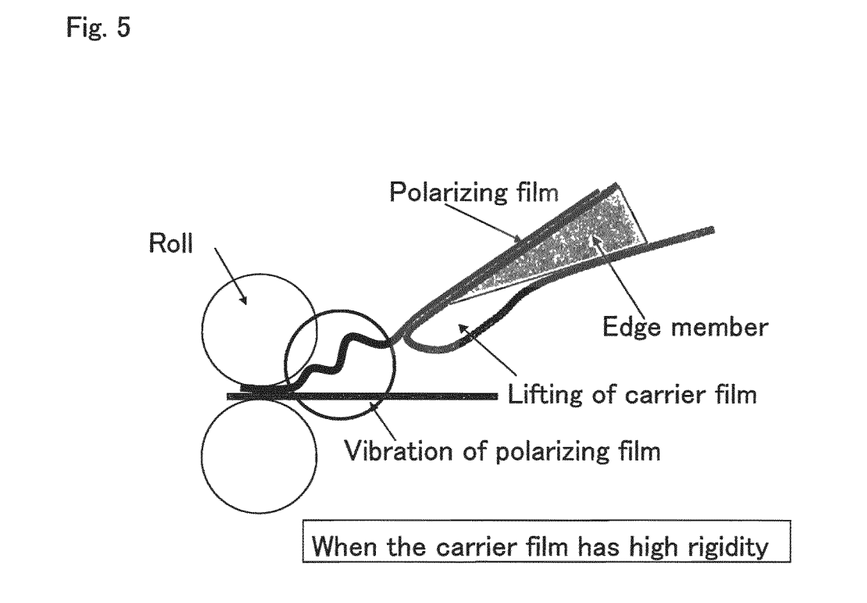
FIG. 5 is a diagram for illustrating the effect of the invention.

When the edge member is used to turn the direction of the feeding of the carrier film, the exposed surface of the optical functional film (e.g., a polarizing film) being peeled off from the carrier film by means of the edge member is bonded to a flat piece member (e.g., a liquid crystal panel). In this process, the bonding speed can fluctuate, so that the tension on the optical functional film can fluctuate. Thus, as shown in FIG. 5, the optical functional film can vibrate immediately before the bonding, and the vibration can easily cause the carrier film to lift from the edge member. As shown in FIG. 5, a carrier film with higher bending rigidity is more resistant to bending, and thus, such a carrier film will significantly lift from the edge member, so that peeling off the carrier film can be made unstable. In this case, a peeling trace on a pressure-sensitive adhesive can be easily left after the peeling-off, and bubbles can be easily formed during the bonding. On the other hand, if the bending rigidity is relatively low, the carrier film can be easily wrinkled or kinked during the bonding of the carrier film to the optical functional film, and bubbles can be easily formed due to this effect. In conclusion, for these reasons, if the bending rigidity per unit length in the longitudinal direction, which is a measure of the bending resistance of the carrier film, is set to fall within the range of from $5.0 \times 10^{-5}$ $N \cdot mm^2$ to $8.0 \times 10^{-2}$ $N \cdot mm^2$, the carrier film can be made less likely to lift, and the bonding can be completed without forming bubbles.

If the carrier film has a longitudinal elastic modulus of less than 3,000 MPa, the carrier film can be easily stretched, so that pieces formed by half-cutting can easily undergo peeling between the pressure-sensitive adhesive and the carrier film during feeding. This peeling can cause bubbles during the bonding. If the longitudinal elastic modulus is more than 5,000 MPa, the film will be harder and can easily begin to break from a notch formed accidentally during the half-cutting, and thus, the film can easily break and easily meander while being fed.

In the above situation, the carrier film preferably has a thickness of from 10 μm to 60 μm. If the carrier film is too thick, half-cut portions can easily undergo peeling between the carrier film and the optical functional film (pressure-sensitive adhesive) in the feeding process after the half-cutting. In this case, there will be a difference in peel strength between the portion suffering from peeling and the portion not suffering from peeling in the peeling process with the edge member, so that the film can vibrate or slack during the bonding, which can be a cause of bubble formation. Thus, the thickness of the carrier film is preferably 60 μm or less. In addition, the thickness of the carrier film is preferably 10 μm or more so that the carrier film bonded to the optical functional film can be prevented from breaking during the half-cutting and during the feeding after the half-cutting.

The belt-shaped optical functional film is preferably wound into a roll. In this case, the optical functional film can be continuously subjected to the bonding while being drawn from the roll. The roll form is also suitable for delivery of optical functional film products.

On the other hand, a method for manufacturing a liquid crystal display device of the present invention is a method, comprising the steps of:

cutting a belt-shaped optical functional film at a predetermined interval while leaving a carrier film uncut, wherein the carrier film adheres to the belt-shaped optical functional film;

peeling off a cut piece of the optical functional film from the carrier film by turning the direction of feeding of the carrier film by means of an edge member; and bonding an exposed surface of the cut piece of the optical functional film to a liquid crystal panel while peeling off the cut piece of the optical functional film, wherein the carrier film has a bending rigidity of from $5.0 \times 10^{-5}$ $N \cdot mm^2$ to $8.0 \times 10^{-2}$ $N \cdot mm^2$ per unit length in its longitudinal direction and has a longitudinal elastic modulus of from 3,000 MPa to 5,000 MPa in its longitudinal direction, wherein the bending rigidity per unit length is expressed by the product E×I, wherein E represents the longitudinal elastic modulus [$N/mm^2$] of the optical functional film, and I represents the second moment of area per unit length expressed by $I = b \times h^3/12$, wherein b represents unit length (1 mm), and h represents film thickness (mm).

The method of the invention for manufacturing a liquid crystal display device has the advantageous effects as described above, and thus makes it possible to effectively prevent bubble formation in the process of bonding the optical functional film. Fortunately, in the method of the invention, the carrier film is less likely to break. Thus, the method of the invention can produce high-quality products in high yield.

The belt-shaped optical functional film is preferably drawn from a roll of belt-shaped optical functional film. In this case, the optical functional film can be continuously bonded to the liquid crystal panel while the belt-shaped optical functional film is drawn from the roll. The roll form is also suitable for delivery of optical functional film products.

MODE FOR CARRYING OUT THE INVENTION

The optical functional film of the invention includes a belt-shaped optical functional film and a carrier film bonded thereto. The optical functional film of the invention is for use in a process that includes cutting the belt-shaped optical functional film at a predetermined interval while leaving the carrier film uncut, then peeling off the cut piece of the optical functional film from the carrier film by turning the direction of the feeding of the carrier film by means of an edge member, and bonding the exposed surface of the cut piece of the optical functional film to a flat piece member while peeling off the cut piece of the optical functional film. The optical functional film material of the invention is suitable for use in the method of the invention for manufacturing a liquid crystal display device. The flat piece member to which the optical functional film is to be bonded may be not only a liquid crystal panel but also any other flat piece member. Examples of such any other flat piece member include any other optical functional film and a display panel such as a plasma display panel, an organic electroluminescent panel, a TFT board, or a printed board.

The method of the invention for manufacturing a liquid crystal display device includes the steps of cutting a belt-shaped optical functional film at a predetermined interval while leaving a carrier film uncut, wherein the carrier film adheres to the belt-shaped optical functional film, peeling off the cut piece of the optical functional film from the carrier film by turning the direction of the feeding of the carrier film by means of an edge member, and bonding the exposed surface of the cut piece of the optical functional film to a liquid crystal panel while peeling off the cut piece of the optical functional film.

Figure 1:
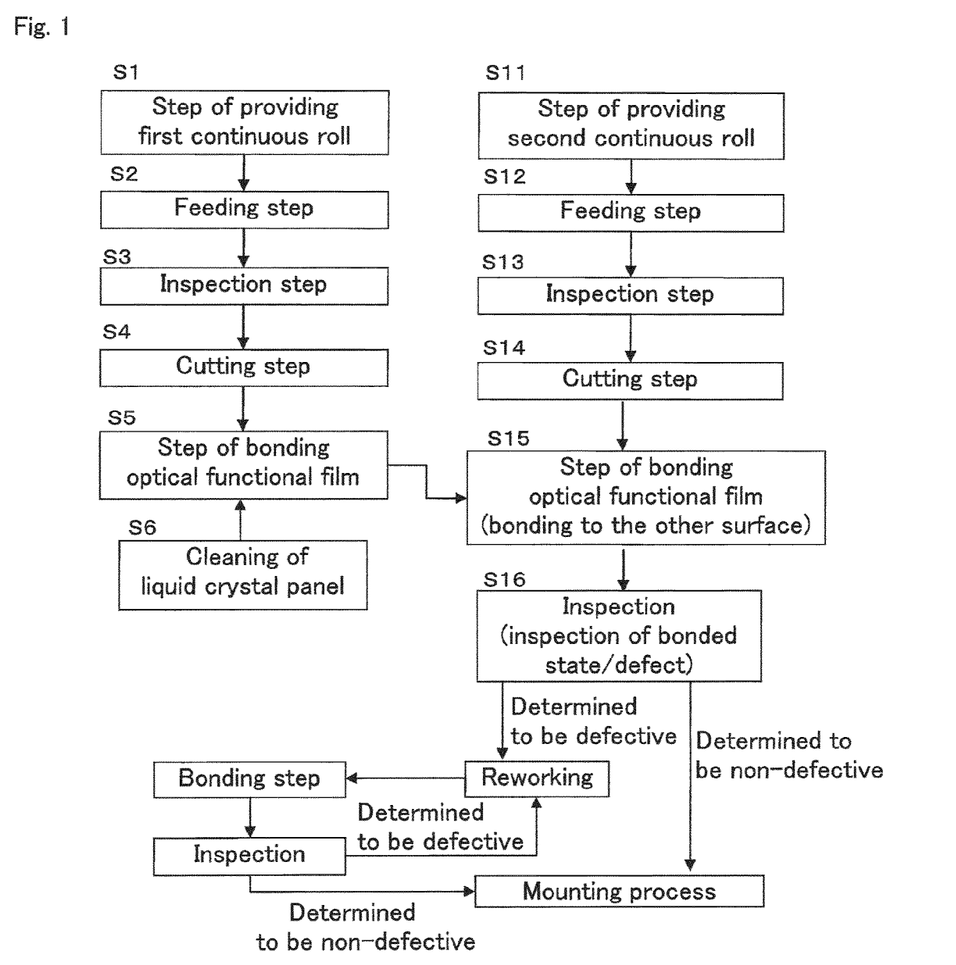
FIG. 1 is a flow chart showing an example of the method of the invention for manufacturing a liquid crystal display device.

For example, the method of the invention for manufacturing a liquid crystal display device may be performed as part of a series of processes as shown in FIG. 1. In the embodiment described below, the method includes the steps of cutting a belt-shaped optical functional film and continuously bonding the cut piece of the optical functional film to a liquid crystal panel, as principal steps, and further includes the steps of providing a continuous roll and feeding and inspecting a film, as optional steps. Hereinafter, each step is described with reference to FIG. 1.

(1) First Continuous Roll Providing Step (S1 in FIG. 1). A roll including belt-shaped optical functional film is provided as a first continuous roll. A width of the first continuous roll depends on a bonding size of the liquid crystal panel. The belt-shaped optical functional film which is wound into the first continuous roll is, for example, a laminated film in which an optical functional film including a polarizer is laminated with a pressure-sensitive adhesive layer and carrier film provisionally bonded to the pressure-sensitive adhesive layer.

Figure 4:
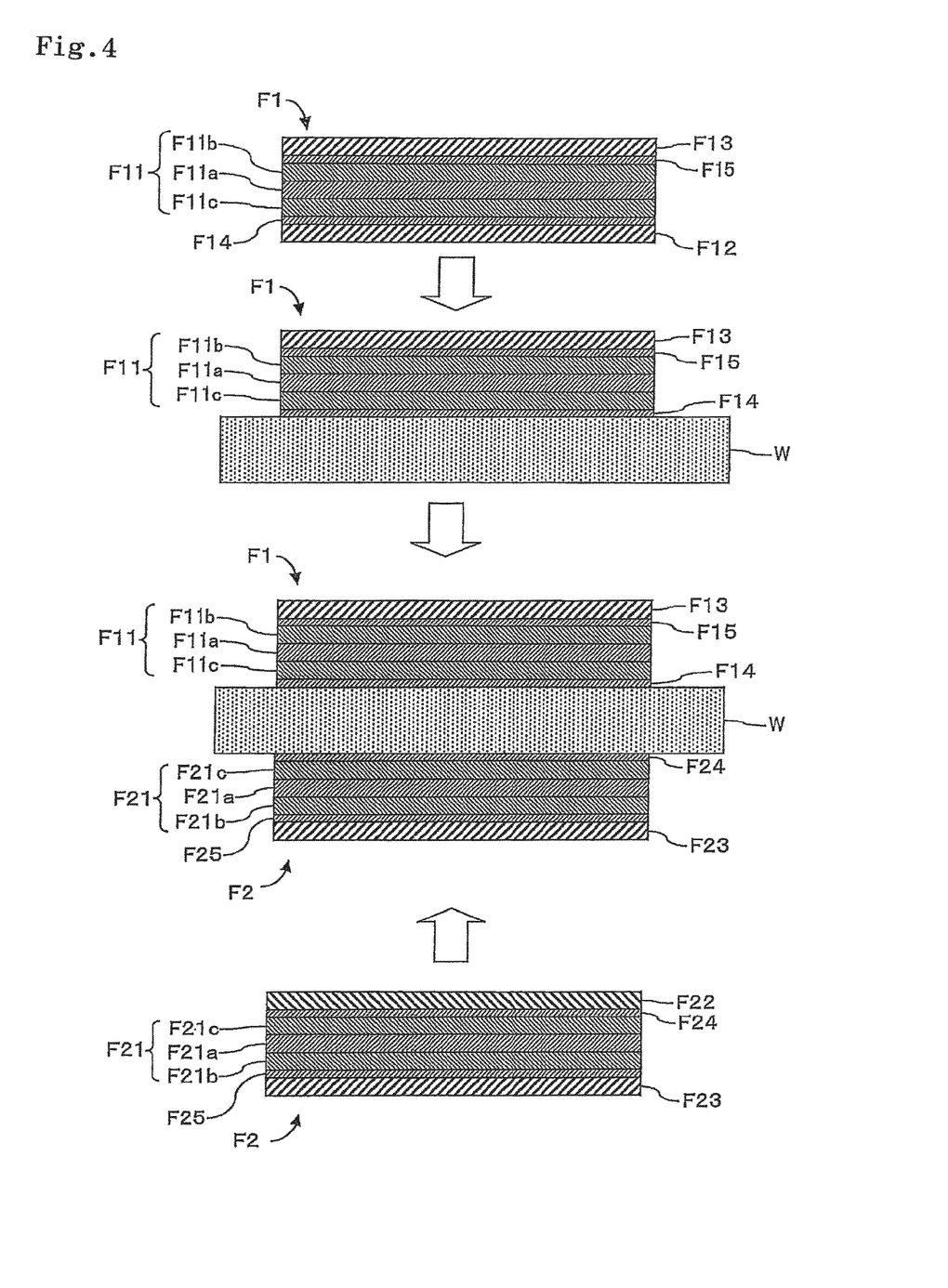
FIG. 4 is a diagram for illustrating an example of the laminated structure of first and second optical functional films.

As shown in FIG. 4, for example, a lamination structure of a first sheet material has a first optical functional film F11, a first carrier film F12 and a surface protecting film F13. The first optical functional film F11 is configured by a first polarizer F11a, a first film F11b provided on one face via an adhesive layer (not shown), and a second film. F11c provided on the other face via the adhesive layer (not shown).

The first and second films F11b and F11c are configured, for example, by a polarizer protecting film (for example, a tri-acetyl cellulose film, a PET film or the like). The second film F11c is bonded to the liquid crystal panel face side via a first pressure-sensitive adhesive layer F14. A surface treatment can be applied to the first film F11b. As the surface treatment, for example, there can be listed up a hard coating, an anti-reflection treatment, a treatment aiming at a prevention of a sticking, a diffusion and an anti-glare, and the like. The first carrier film F12 is provided via the second film F11c and the first pressure-sensitive adhesive layer F14. Further, the surface protecting film F13 is provided via the first film F11b and the pressure-sensitive adhesive layer F15. In the following description, there is a case that the laminated structure of the polarizer and the polarizer protecting film is called as the polarizing plate.

(2) Feeding Step (S2 in FIG. 1). The first sheet material is unwound from the provided and placed first continuous roll, and is fed to a downstream side. The first feeder feeding the first sheet material is constructed, for example, by a pair of nip rollers, a tension roller, a rotary drive, an accumulator, a sensor, a controller and the like. The first sheet material has the first carrier film which functions as carrier film.

(3) First Inspection Step (S3 in FIG. 1). A defect of the first sheet material is inspected by using a first defect inspection apparatus. As a defect inspection method in this case, there can be listed up a method of performing imaging and image processing generated by a transmitted light and a reflected light with respect to both faces of the first sheet material, a method of performing imaging and image processing by arranging a polarization film for inspection between a CCD camera and a subject to be inspected, in such a manner as to form crossed nicols relation (which may be called as 0 degree cross) to a polarization axis of the polarization plate corresponding to the subject to be inspected, and a method of performing imaging and image processing by arranging a polarization film for inspection between a CCD camera and a subject to be inspected, in such a manner as to form a predetermined angle (for example, in a range larger than 0 degree and less than 10 degree) (which may be called as x degree cross) to a polarization axis of the polarization plate corresponding to the subject to be inspected. In this case, a known method can be applied to an algorithm of the image processing, for example, the defect can be detected by grayscale determination in accordance with a binarization processing.

In the performing imaging and image processing method by the transmitted light, it is possible to detect a contaminant in an inner portion of the first sheet material. In the performing imaging and image processing method by the reflected light, it is possible to detect a contaminant attached to the front face of the first sheet material. In the performing imaging and image processing method by the 0 degree cross, it is possible to mainly detect a contaminant on the front face, a dirty, a contaminant in an inner portion and the like as a bright spot. In the performing imaging and image processing method by the x degree cross, it is possible to mainly detect a knick.

The information of the defect obtained by the first defect inspection apparatus is associated with its positional information (for example, a position coordinate), is transmitted to a controller, and can contribute to a cutting method by a first cutting apparatus mentioned below.

Instead of carrying out these inspection steps in continuous production process, similar effect for improving yield can be obtained by carrying out an inspection step in production process of the continuous roll. Namely, there is a case that the defect information (the defect coordinate, the kind of the defect, the size or the like) of the first and second sheet materials is attached as a code information (for example, a QR code and a bar code) to one end portion in a width direction of the first and second material rolls at a predetermined pitch unit (for example, 1000 mm). In the case mentioned above, the step reads the cord information in a preliminary stage of the cutting, and cuts into a predetermined size in the first and second cutting steps in such a manner as to avoid the defect portion based on the analysis (which may be called as a skip cut). Further, the portion including the defect is structured such as to be removed or be bonded to the other member than the liquid crystal panel, and the piece of sheet material which is cut into the predetermined size and is determined as the non-defective is structured such as to be bonded to the liquid crystal panel. Accordingly, a yield ratio of the optical display device is widely improved.

(4) First Cutting Step (S4 in FIG. 1). The first cutting apparatus cuts the first optical functional film and the first pressure-sensitive adhesive layer to a predetermined size without cutting the first carrier film (half cut). The structure is made such as to cut so as to avoid the defect, based on the information of the defect obtained by the first defect inspection apparatus 14. Accordingly, a yield ratio of the first sheet material is widely improved. The first sheet material including the defect is excluded by a first rejection apparatus mentioned below, and is structured such as not to be attached to an liquid crystal panel W.

(5) First Optical functional film Bonding Step (S5 in FIG. 1). The first optical functional film from which the first carrier film is removed is bonded to the liquid crystal panel via the first pressure-sensitive adhesive layer by using a first bonding apparatus while removing the first carrier film by using the first peeling apparatus. At a time of the bonding, the first optical functional film and the liquid crystal panel are pinched by roll pairs so as to be crimped. When the carrier film is peeled off, it can be peeled off from the pressure-sensitive adhesive layer by turning, at an acute angle, the direction of feeding of the carrier film by means of an edge member.

(6) Cleaning Step (S6 in FIG. 1). The liquid crystal panel is cleaned, if necessary, on its surface by a polishing cleaning apparatus and a water cleaning apparatus. The cleaned liquid crystal panel is fed to an inspection apparatus by a feeder mechanism.

(7) Second Continuous roll Providing Step (S11 in FIG. 1). A roll including belt-shaped optical functional film is provided as the second continuous roll. A laminated structure of the second sheet material is the same structure as the first sheet material, however, is not limited to this. As shown in FIG. 4, the laminated structure of the second sheet material F2 has the similar structure to the first sheet material, however, is not limited to this. For example, the second sheet material F2 has the second optical functional film F21, a second carrier film F22, and a surface protecting film F23. The second optical functional film F21 is configured by a second polarizer 21a, a third film F21b provided on one face thereof via an adhesive layer (not shown), and a fourth film F21c provided on the other face thereof via an adhesive layer (not shown).

The third and fourth films F21b and F21c are configured, for example, by a polarizer protecting film (for example, a tri-acetyl cellulose film, a PET film or the like). The fourth film F21c is bonded to the liquid crystal panel face side via a second pressure-sensitive adhesive layer F24. A surface treatment can be applied to the third film F21b. As the surface treatment, for example, there can be listed up a hard coat treatment, a reflection preventing treatment, a treatment aiming at a prevention of a sticking, a diffusion and an anti-glare, and the like. The second carrier film F22 is provided via the fourth film F21c and the second pressure-sensitive adhesive layer F24. Further, the surface protecting film F23 is provided via the third film F21b and the pressure-sensitive adhesive layer F25.

(8) Feeding Step (S12 in FIG. 1). The second sheet material is unwound from the provided and placed second continuous roll, and is fed to a downstream side. The second feeder feeding the second sheet material is constructed, for example, by a pair of nip rollers, a tension roller, a rotary drive, an accumulator, a sensor, a controller and the like.

(9) Second Inspecting Step (S13 in FIG. 1). A defect of the second sheet material is inspected by using a second defect inspection apparatus. The defect inspecting method in this case is the same as the method by the first defect inspection apparatus mentioned above.

(10) Second Cutting Step (S14 in FIG. 1). A second cutting apparatus cuts the second optical functional film and the second pressure-sensitive adhesive layer to a predetermined size without cutting the second carrier film (half cut). The structure is made such as to cut so as to avoid the defect, based on the information of the defect obtained by the second defect inspection apparatus. Accordingly, a yield ratio of the second sheet material is widely improved. The second sheet material including the defect is excluded by a second rejection apparatus, and is structured such as not to be attached to an liquid crystal panel.

(11) Second Optical functional film Bonding Step (S15 in FIG. 1). Next, after the second cutting step, the second optical functional film from which the second carrier film is removed is bonded to a different face from the face to which the first optical functional film of the liquid crystal panel is bonded, via the second pressure-sensitive adhesive layer by using a second bonding apparatus while removing the second carrier film by using the second peeling apparatus. In this case, there is a case that the liquid crystal panel is rotated at 90 degree by a feed direction switching mechanism of a feed mechanism before bonding the second optical functional film to the liquid crystal panel, thereby making the first optical functional film and the second optical functional film in a relation of crossed nicols. At a time of bonding, the second optical functional film and the liquid crystal panel are executed pressure bonding by being pinched by the rolls.

(12) Inspecting Step of Optical Display Device (S16 in FIG. 1). The inspecting apparatus detects the liquid crystal panel in which the optical functional film is bonded to both the faces. As an inspecting method, there can be exemplified a method of performing imaging and image processing by the reflected light with respect to both the faces of the liquid crystal panel. Further, as the other method, there can be listed up a method of using the polarization film for inspecting placed between the CCD camera and the subject to be inspected. In this case, a known method can be applied to an algorithm of the image processing, and it is possible to detect the defect, for example, by grayscale determination in accordance with a binarization processing.

(13) A non-defective of the liquid crystal display device is determined based on the information of the defect obtained by the inspecting apparatus. The liquid crystal display device determined as the non-defective is fed to the next mounting process. In the case that a defective is determined, a reworking process is applied, and the optical functional film is bonded newly, and is next inspected. In the case that the non-defective is determined, the process gives way to the mounting process, and in the case that the defective is determined, the process again gives way to the reworking process or the defective is put on the shelf.

In the series of manufacturing processes, the liquid crystal display device can be advantageously manufactured by performing the step of bonding the first optical functional film and the step of bonding the second optical functional film in a continuous manufacturing line.

Figure 2:
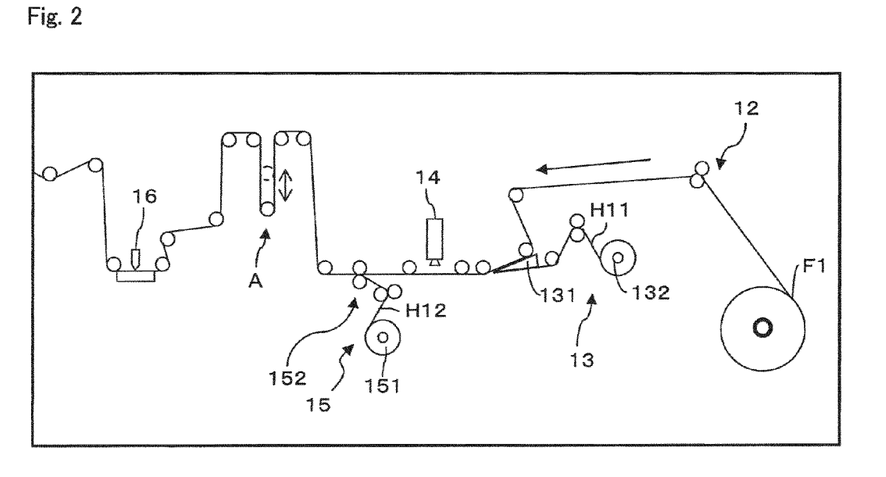
FIG. 2 is a schematic diagram showing a typical manufacturing system for use in the liquid crystal display device-manufacturing method of the invention.
Figure 3:
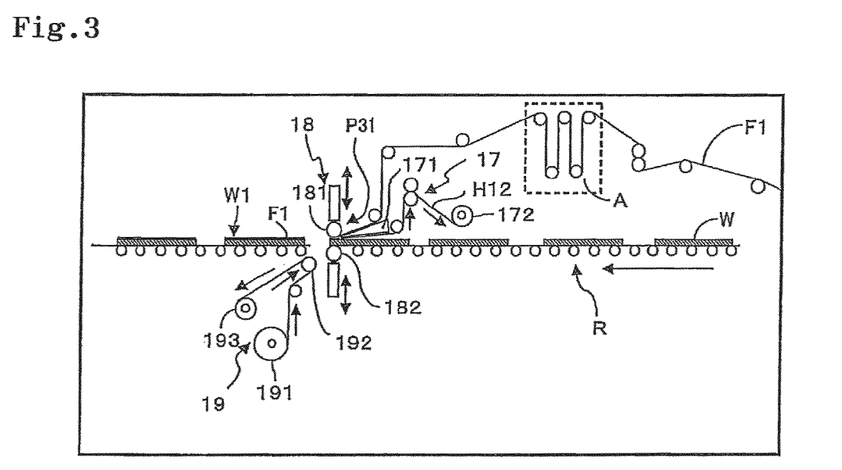
FIG. 3 is a schematic diagram showing a typical manufacturing system for use in the liquid crystal display device-manufacturing method of the invention.

Next, a description is given of a manufacturing system for performing each step. As shown in FIGS. 2 and 3, the manufacturing system typically includes a first feeder 12, a first pre-inspection peeling apparatus 13, a first defect inspection apparatus 14, a first carrier film bonding apparatus 15, a first cutting apparatus 16, a first peeling apparatus 17, and a first bonding apparatus 18. In the invention, the first optical functional film can be accurately inspected using the first pre-inspection peeling apparatus 13, the first defect inspection apparatus 14, and the first carrier film bonding apparatus 15. Alternatively, however, these apparatuses may be omitted.

The first continuous roll of the long first sheet material F1 is mounted on a roll mount apparatus that is geared to a motor or the like to rotate freely or at a certain speed. A controller is provided to set the rotational speed and to control the drive.

The first feeder 12 is used to feed the first sheet material F1 to the downstream side. The first feeder 12 includes a pair of nip rollers, a tension roller, a rotary drive, an accumulator A, a sensor, a controller, and other components, and is controlled by the controller. The first feeder 12 feeds the uncut optical functional film or the cut piece of the optical functional film to the first bonding apparatus 18 while applying tension to the first carrier film. At the place where the first defect inspection apparatus 14 is provided, only the optical functional film is fed to the downstream side without using the first carrier film.

The first pre-inspection peeling apparatus 13 is configured to peel off the carrier film H11 from the first sheet material F1 being fed and to wind the carrier film H11 on a roll 132. The speed of the winding on the roll 132 is controlled by the controller. The peeling mechanism 131 has a sharp-ended knife edge member and is configured to peel off the carrier film H11 by hooking the carrier film H11 on the knife edge member and turning the direction of the feeding of the carrier film H11 and also configured to feed the first sheet material F1 in the feed direction after the carrier film H11 is peeled off.

The first defect inspection apparatus 14 inspects defects after the carrier film H11 is peeled off. The first defect inspection apparatus 14 has a CCD camera, in which image data taken by the CCD camera is analyzed so that defects are detected and their position coordinates are calculated. The defect position coordinates are used in skip cutting with the first cutting apparatus 16 described below.

After the first defect inspection, the first carrier film bonding apparatus 15 bonds the carrier film H12 to the first optical functional film F11 with the first pressure-sensitive adhesive layer F14 interposed therebetween. As shown in FIG. 2, the carrier film H12 is drawn from the continuous roll 151 of the carrier film H12, and the carrier film H12 and the first optical functional film F11 are inserted between one or more pairs of rollers 152 so that they are bonded together under a certain pressure from the pair of rollers 152. The rotational speed of the pair of rollers 152, the pressure, and the feeding are controlled by the controller.

After the carrier film H12 is bonded, the first cutting apparatus 16 cuts the first optical functional film F11 at predetermined intervals while maintaining the continuity of the carrier film H12. When the first sheet material F1 shown in FIG. 4 is used, the carrier film H12 is completely left uncut, while the first optical functional film F11, the surface protecting film F13, the first pressure-sensitive adhesive layer F14, and the pressure-sensitive adhesive layer F15 are cut into a predetermined size.

Examples of the cutting means used in the first cutting apparatus 16 include a cutter having any of various blades, a laser, etc. In particular, a cutter having a knife-type blade, which will not be accompanied by grinding (in the case of saw type), is preferably used, because it is less likely to produce dust such as sawdust. Examples of the cutter having a knife-type blade include a cutter in which cutting is performed with a blade being moved in the cutting direction, such as a cutter having a rotary circular blade, a stationary circular blade, a cutter knife, or the like; and a cutter in which cutting is performed with a blade not being moved in the cutting direction, such as a cutter having a shearing blade or a straight Thomson blade.

Based on the defect position coordinates detected by the first defect inspection, the first cutting apparatus 16 cuts the material into the predetermined size in such a manner that defective portions can be separated. Thus, cut pieces having any defective portion are rejected as defectives in a later step by a first rejection apparatus 19. Alternatively, the first cutting apparatus 16 may ignore defective portions and successively cut the material into the predetermined size. In this case, the bonding process, which is described below, may be designed not to bond, but to remove the defective portion. In this case, the controller also functions to control the process.

The first cutting apparatus 16 has a holding table for sucking and holding the first sheet material F1 from the back side as needed. The accumulator A of the feeder is configured to move vertically upward and downward so that continuous feeding of the first sheet material F1 can be prevented from being stopped on the upstream and downstream sides when the first sheet material F1 is sucked by the holding table. This operation is also controlled by the controller.

The first bonding apparatus 18 bonds each first sheet material (each cut piece of the first optical functional film) to a liquid crystal panel W with the first pressure-sensitive adhesive layer F14 interposed therebetween, after the first sheet material undergoes the cutting process and is peeled off from the carrier film H12 by the first peeling apparatus 17. The first sheet material feeding route is placed above the liquid crystal panel W feeding route.

In the bonding process, as shown in FIG. 3, the first optical functional film F11 is bonded to the surface of the liquid crystal panel W while it is pressed against the surface by a press roller 181 and a guide roller 182. The pressure from the press roller 181 and the guide roller 182, and the driving operation thereof are controlled by the controller.

The peeling mechanism 171 of the first peeling apparatus 17 has a sharp-ended edge member and is configured to peel off the carrier film H12 by hooking the carrier film H12 on the knife edge member and turning the direction of the feeding of the carrier film H12 and also configured to feed the first sheet material (first optical functional film F11) to the surface of the liquid crystal panel W after the carrier film H12 is peeled off. The removed carrier film H12 is wound on a roll 172. Winding it on the roll 172 is controlled by the controller.

The tip of the edge member typically has a radius of curvature of 0.1 to 2.5 mm, preferably 1 to 1.5 mm, in order to smoothly peel off the carrier film H12 from the pressure-sensitive adhesive layer. In addition, the tensile force applied to the removed carrier film H12 (the tensile force for peeling off) is typically from 0.1 to 0.2 N/mm, preferably from 0.15 to 0.2 N/mm, in view of stable feeding.

The bonding mechanism includes a press roller 181 and a guide roller 182 opposed thereto, which are placed in the bonding position P31. The guide roller 182 is provided movable upward and downward, and includes a rubber roller whose rotation is driven by a motor. The press roller 181 is provided movable upward and downward immediately above the guide roller 182, and includes a metallic roller whose rotation is driven by a motor. When the liquid crystal panel W is fed to the bonding position, the press roller 181 is elevated to a position higher than the upper surface so that the space between the rollers is widened. Alternatively, the guide roller 182 and the press roller 181 may each be a rubber roller or a metallic roller. As described above, the system is configured so that the liquid crystal panel W can be cleaned by any type of cleaning apparatus and fed by the feeding mechanism R. The feeding mechanism R is also controlled by the controller.

A description is given of the first rejection apparatus 19 to reject the first sheet material F1 having any defect. When the first sheet material F1 having a defect is transported to the bonding position, the guide roller 182 moves vertically downward. Subsequently, a roller 192 over which a pressure-sensitive adhesive tape 191 is looped moves to the regular position of the guide roller 182. The press roller 181 is allowed to move vertically downward to press the defect-containing first sheet material F1 against the pressure-sensitive adhesive tape 191. Thus, the defect-containing first sheet material F1 is bonded to the pressure-sensitive adhesive tape 191 and wound on a roller 193 together with the pressure-sensitive adhesive tape 191.

The liquid crystal panel W1 manufactured by the above process is fed to the downstream side, and the second optical functional film F21 (second sheet material F2) is bonded thereto. Since a series of steps for the second optical functional film F21 (second sheet material F2) are the same as those for the first optical functional film F11 (first sheet material F1), a detailed description thereof is omitted herein.

Using the liquid crystal panel to which the optical functional films are bonded, a liquid crystal display device can be manufactured according to conventional techniques. Specifically, a liquid crystal display device can be typically formed by properly assembling the liquid crystal panel and the optical functional films, and optional components such as a lighting system, and by incorporating a driving circuit. The liquid crystal panel to be used may be of any type such as TN type, STN type, π type, VA type, or IPS type.

According to the invention, any desired liquid crystal display device can be manufactured, such as a liquid crystal display device including a liquid crystal panel and a pressure-sensitive adhesive optical functional film or films placed on one or both sides of the liquid crystal panel, or a liquid crystal display device using a backlight or a reflector in the lighting system. In that case, the optical functional film or films according to the invention may be placed on one or both sides of the liquid crystal panel. The optical functional films placed on both sides may be the same or different.

In the process of forming the display device, one or more layers of an additional desired component or components such as a diffusion plate, an antiglare layer, an anti-reflection film, a protective plate, a prism array, a lens array sheet, a light diffusion plate, or a backlight may also be placed at a desired location or locations.

The optical functional film of the invention includes a carrier film and a belt-shaped optical functional film for use in a process including bonding the exposed surface of the optical functional film to a sheet material as described above, in which the carrier film has a bending rigidity of from $5.0 \times 10^{-5}$ N·mm$^2$ to $8.0 \times 10^{-2}$ N·mm$^2$ per unit length in its longitudinal direction and also has a longitudinal elastic modulus of from 3,000 MPa to 5,000 MPa in its longitudinal direction.

For the reasons described above, the carrier film preferably has a bending rigidity of from $1 \times 10^{-2}$ N·mm$^2$ to $7 \times 10^{-2}$ N·mm$^2$ per unit length in its longitudinal direction and a longitudinal elastic modulus of from 3,300 MPa to 4,700 MPa in its longitudinal direction, and more preferably has a bending rigidity of from $3 \times 10^{-2}$ N·mm$^2$ to $5 \times 10^{-2}$ N·mm$^2$ per unit length in its longitudinal direction and a longitudinal elastic modulus of from 3,600 MPa to 4,400 MPa in its longitudinal direction.

For the reasons described above, the carrier film preferably has a thickness of from 10 µm to 60 µm, and also in view of cost, handleability, and film rigidity, the carrier film more preferably has a thickness of from 20 µm to 40 µm.

In terms of satisfying the physical properties described above, a polymer film is advantageously used to form the carrier film. Examples of such a polymer film include a polyethylene film, a polypropylene film, a polybutene film, a polybutadiene film, a polymethylpentene film, a polyvinyl chloride film, a vinyl chloride copolymer film, a polyethylene terephthalate film, a polybutylene terephthalate film, a polyurethane film, and an ethylene-vinyl acetate copolymer film. Particularly preferred is a polyester film such as a polyethylene terephthalate film, a polybutylene terephthalate film, or a polyethylene naphthalate film.

If necessary, the carrier film may be subjected to a release treatment and an antifouling treatment with a silicone, fluoride, long-chain alkyl, or fatty acid amide release agent, silica powder or the like, or subjected to an antistatic treatment of coating type, kneading and mixing type, vapor-deposition type, or the like. In particular, when the surface of the carrier film is appropriately subjected to a release treatment such as a silicone treatment, a long-chain alkyl treatment, or a fluorine treatment, the releasability from the pressure-sensitive adhesive layer can be further improved. In the invention, the pressure-sensitive adhesive layer is preferably bonded to a release-treated carrier film, more preferably bonded to a silicone release-treated carrier film.

For example, the peel strength between the carrier film and the pressure-sensitive adhesive layer is generally from 0.05 N/50 mm to 0.3 N/50 mm. The peel strength is the value measured by the method described below.

<Peel Strength>

An optical sheet material containing a carrier film is cut into a 50 mm wide piece. The carrier film is peeled off at an angle of 90° from the piece at 23° C. and a peel rate of 300 mm/minute, when the initial adhesive strength is measured. The adhesive strength is measured according to JIS Z 0237.

In the invention, the belt-shaped optical functional film is preferably provided in the form of a roll (continuous roll), which is obtained by winding the belt-shaped optical functional film into a roll.

The belt-shaped optical functional film includes an optical functional film and a carrier film provided on at least one side of the optical functional film with a pressure-sensitive adhesive layer interposed therebetween. The optical functional film may be of any type capable of being bonded to a liquid crystal panel. For example, the optical functional film may be a polarizing film including a polarizer and a protective film or films provided on one or both sides of the polarizer. The optical functional film may also be a laminate including a polarizer or a polarizing film and a retardation film or any other optical compensation film appropriately placed thereon.

An acrylic pressure-sensitive adhesive may be used to form the pressure-sensitive adhesive layer. Such an acrylic pressure-sensitive adhesive preferably includes an acrylic (co) polymer containing 80% by weight or more of an alkyl (meth) acrylate. Such an acrylic pressure-sensitive adhesive is preferably used because it has a high level of optical transparency and weather resistance or heat resistance and exhibits appropriate wettability and pressure-sensitive adhesive properties such as appropriate cohesiveness and tackiness.

The pressure-sensitive adhesive layer can be formed by applying a pressure-sensitive adhesive composition to a base material and then curing the composition by heat treatment. For example, a method of forming the pressure-sensitive adhesive layer includes applying the pressure-sensitive adhesive composition to a carrier film, such as a release-treated carrier film, used as a base material, drying the composition to remove the polymerization solvent and other components, curing the composition to form a pressure-sensitive adhesive layer, and then transferring the pressure-sensitive adhesive layer onto an optical functional film. Another method of forming the pressure-sensitive adhesive layer includes applying the pressure-sensitive adhesive composition directly to an optical functional film used as a base material, drying the composition to remove the polymerization solvent and other components, and curing the composition to form a pressure-sensitive adhesive layer on the optical functional film. In the process of applying the pressure-sensitive adhesive, one or more solvents other than the polymerization solvent may be newly added to the composition.

In the process of forming a pressure-sensitive adhesive optical functional film according to the invention, the surface of the optical functional film may also be coated with an anchor layer or subjected to any of various adhesion-facilitating treatments such as a corona treatment and a plasma treatment, before the pressure-sensitive adhesive layer is formed. The surface of the pressure-sensitive adhesive layer may also be subjected to an adhesion-facilitating treatment.

The thickness of the pressure-sensitive adhesive layer is preferably from 5 to 50 µm, more preferably from 10 to 25 µm, for the purpose of ensuring sufficient adhesive power and maintaining durability in heat test or wet heat test.

In the invention, the pressure-sensitive adhesive layer is protected by the release carrier film (carrier film) until it is bonded to the liquid crystal panel.

The optical functional film may be of any type used to form an image display device such as a liquid crystal display device. For example, the optical functional film may be a polarizing film. The polarizing film generally used includes a polarizer and a protective film or films provided on one or both sides of the polarizer.

For example, the polarizer may be a product produced by a process including adsorbing a dichroic material such as iodine or a dichroic dye onto a hydrophilic polymer film such as a polyvinyl alcohol-based film, a partially-formalized polyvinyl alcohol-based film, or a partially-saponified, ethylene-vinyl acetate copolymer-based film and uniaxially stretching the film or maybe a polyene-based oriented film such as a film of a dehydration product of polyvinyl alcohol or a dehydrochlorination product of polyvinyl chloride. In particular, a polarizer including a polyvinyl alcohol-based film and a dichroic material such as iodine is advantageous. The thickness of the polarizer is generally, but not limited to, about 5 to about 80 μm.

For example, a polarizer including a uniaxially-stretched polyvinyl alcohol-based film dyed with iodine may be produced by a process including immersing a polyvinyl alcohol film in an aqueous iodine solution to dye the film and stretching the film to 3 to 7 times the original length. If necessary, the polyvinyl alcohol-based film may be immersed in an aqueous solution of potassium iodide or the like optionally containing boric acid, zinc sulfate, zinc chloride, or the like. If necessary, the polyvinyl alcohol-based film may be immersed in water for washing before it is dyed. If the polyvinyl alcohol-based film is washed with water, dirt and any anti-blocking agent can be cleaned from the surface of the polyvinyl alcohol-based film, and the polyvinyl alcohol-based film can also be allowed to swell so that unevenness such as uneven dyeing can be effectively prevented. The film may be stretched before, while, or after it is dyed with iodine. The film may also be stretched in an aqueous solution of boric acid, potassium iodide, or the like or in a water bath.

The material used to form the protective film is typically thermoplastic resin with a high level of transparency, mechanical strength, thermal stability, water blocking properties, isotropy, etc. Examples of such thermoplastic resin include cellulose resin such as triacetylcellulose, polyester resin, polyethersulfone resin, polysulfone resin, polycarbonate resin, polyamide resin, polyimide resin, polyolefin resin, (meth)acrylic resin, cyclic polyolefin resin (norbornene resin), polyarylate resin, polystyrene resin, polyvinyl alcohol resin, and any blend thereof. The protective film may be bonded to one side of the polarizer with a pressure-sensitive adhesive layer. In this case, thermosetting or ultraviolet-curable resin such as (meth)acrylic, urethane, acrylic urethane, epoxy, or silicone resin may be used to form a protective film on the other side.

Examples of the optical functional film also include a reflector, a transflector, a retardation plate (including a wavelength plate such as a half or quarter wavelength plate), a viewing angle compensation film, a brightness enhancement film, and any other optical layer that can be used to form a liquid crystal display device or the like. These optical components may be used alone as the optical functional film, or one or more layers of any of these optical components may be used with the polarizing film to forma laminate for practical use.

An optical functional film including a laminate of the polarizing film and the optical layer may be formed by a method of stacking them one by one in the process of manufacturing a liquid crystal display device or the like. On the other hand, an optical functional film formed by laminating them in advance has the advantage that it can facilitate the process of manufacturing a liquid crystal display device or the like, because it has high quality stability and good assembling workability. In the lamination, any appropriate bonding means such as a pressure-sensitive adhesive layer may be used. When the polarizing film and the additional optical layer are bonded together, their optical axes may be each aligned at an appropriate angle, depending on the desired retardation properties or other desired properties.

EXAMPLES

Hereinafter, the invention is more specifically described with reference to the examples, which however are not intended to limit the invention. Unless otherwise specified, "parts" and "%" in each example are all by weight. The evaluation items in the examples and others were measured as described below.

(Longitudinal Elastic Modulus of Carrier Film)

The carrier film was cut into a belt-shape with a width of 10 mm and a length of 100 mm. In the measurement under a 25° C. temperature environment, the belt-shaped sample was pulled in the longitudinal direction under the conditions below using a universal tensile/compression tester (Tensilon). The resulting S-S (Stress-Strain) curve was used to determine the tensile elastic modulus. The measurement was performed under the conditions of a tension rate of 50 mm/minute, a chuck-chuck distance of 50 mm, and room temperature. The elastic modulus was determined from the S-S curve by a method including drawing a tangent line from the initial rise point of the S-S curve, reading the strength at the point where an extension of the tangent line reaches 100% strain, and calculating the longitudinal (tensile) elastic modulus by dividing the read value by the cross-sectional area of the sample belt (thickness×sample width (10 mm)).

(Bending Rigidity of Carrier Film per Unit Length)

The bending rigidity of the carrier film per unit length was calculated from the determined longitudinal elastic modulus of the carrier film as follows. The bending rigidity per unit length is expressed by the product E×I, wherein E is the longitudinal elastic modulus [N/mm$^2$] of the optical functional film, and I is the second moment of area per unit length. The second moment of area is expressed by I=b×h$^3$/12, wherein b is unit length (1 mm), and h is film thickness (mm). The bending rigidity per unit length is calculated from these values.

(Degree of Lifting of Carrier Film from Edge Member)

Using the continuous roll obtained in each of the examples and the like, cut pieces of the optical functional film were bonded to liquid crystal panels, respectively, by means of the bonding apparatus shown in FIG. 3 (in which the tip of the edge member for use in peeling off the carrier film had a radius of curvature of 1.5 mm, the turning angle was 170° (interior angle 10°), and the tension was 150 N/mm), which was placed in series with the apparatus shown in FIG. 2. In this process, 100 pieces were bonded, and it was visually evaluated whether or not the carrier film lifted from the tip of the edge member. Each liquid crystal panel used was one having a glass substrate for 32-inch TV.

(Degree of Wrinkling or Kinking During Bonding of Carrier Film to Polarizing Film)

The continuous roll obtained in each of the examples and the like was used and evaluated. The carrier film bonded to the polarizing film was visually observed over a length of 1 m and evaluated as to whether or not wrinkling or kinking occurred in the carrier film.

(Rate of Occurrence of Peeling Between Pressure-Sensitive Adhesive and Carrier Film at End of Piece Formed by Half-Cutting)

The continuous roll obtained in each of the examples and the like was used and evaluated. As described above, 100 pieces were bonded using the bonding apparatus shown in FIG. 3, which was placed in series with the apparatus shown in FIG. 2. In this process, visual evaluation was performed immediately before the bonding as to whether or not peeling occurred between the pressure-sensitive adhesive and the carrier film at the end of each piece formed by the half-cutting.

(Rate of Occurrence of Bubbles)

Using the continuous roll obtained in each of the examples and the like, 100 pieces were bonded as described above by means of the bonding apparatus shown in FIG. 3, which was placed in series with the apparatus shown in FIG. 2. After the bonding, it was visually evaluated whether or not bubbles occurred in each product.

(Rate of Occurrence of Carrier Film Break)

Using the continuous roll obtained in each of the examples and the like, 100 pieces were bonded as described above by means of the bonding apparatus shown in FIG. 3, which was placed in series with the apparatus shown in FIG. 2. In this process, it was evaluated whether or not the carrier film broke at any half-cut part.

Example 1

To a four-neck flask equipped with a nitrogen gas introducing tube and a condenser were added 95 parts of butyl acrylate (BA), 5 parts of acrylic acid (AA), 0.1 parts of 2,2-azobisisobutyronitrile, and 140 parts of ethyl acetate. After the air was sufficiently replaced with nitrogen gas, the mixture was subjected to a polymerization reaction at 55° C. for 8 hours with stirring under a nitrogen stream, so that a high molecular weight polymer A with a weight average molecular weight of 1,700,000 was obtained.

Based on 100 parts of the solid in the resulting polymer solution, 0.5 parts of a polyisocyanate crosslinking agent (CORONATE L (product name) manufactured by NIPPON POLYURETHANE INDUSTRY CO., LTD.) including a trimethylolpropane-tolylene diisocyanate adduct, and 3-glycidoxypropyltrimethoxysilane (KBM403 (product name) manufactured by SHIN-ETSU CHEMICAL CO., LTD.) were added to the polymer solution. The resulting pressure-sensitive adhesive composition was then applied to a 6.3 μm thick, silicone release treated, long carrier film (LUMIRROR F53 manufactured by TORAY INDUSTRIES, INC.) with a fountain coater so that a 25 μm thick coating could be formed after drying. The composition was dried at 150° C. for 2 minutes, so that a pressure-sensitive adhesive layer was obtained on the carrier film. The pressure-sensitive adhesive layer on the carrier film was bonded to a long polarizing film, and the resulting laminate was wound into a continuous roll, which was composed of the carrier film and the pressure-sensitive adhesive layer-carrying polarizing film.

The polarizing film was prepared as described below. An 80 μm thick polyvinyl alcohol film was stretched to 3 times between rolls different in velocity ratio, while it was dyed in a 0.3% iodine solution at 30° C. for 1 minute. The film was then stretched to a total stretch ratio of 6 times, while it was immersed in an aqueous solution containing 4% of boric acid and 10% of potassium iodide at 60° C. for 0.5 minutes. Subsequently, the film was cleaned by immersion in an aqueous solution containing 1.5% of potassium iodide at 30° C. for 10 seconds, and then dried at 50° C. for 4 minutes to give a polarizer. Saponified triacetylcellulose films each with a thickness of 80 μm were bonded to both sides of the polarizer with a polyvinyl alcohol-based adhesive, so that a polarizing film was obtained.

Examples 2 to 7

Continuous rolls each composed of a carrier film and a pressure-sensitive adhesive layer-carrying polarizing film were obtained under the same conditions as those in Example 1, except that the carrier film was changed as shown in Table 1. The carrier films used in the examples and the comparative examples are shown in Table 1.

TABLE 1

| Product name | Thickness [μm] | Longitudinal elastic modulus [MPa] |
|---|---|---|
| TORAY LUMIRROR F57 | 4.5 | 4000 |
| TORAY LUMIRROR F53 | 6.3 | 4000 |
| TORAY LUMIRROR S10 | 12 | 4000 |
| Mitsubishi MRF25 | 25 | 4500 |
| TORAY TORAYFAN 9407 | 30 | 690 |
| Mitsubishi MRF38CK | 38 | 4000 |
| TORAY LUMIRROR X20 | 38 | 5000 |
| TORAY LUMIRROR E60 | 50 | 3200 |
| Mitsubishi MRN50 | 50 | 4600 |
| Mitsubishi MRF75CK | 75 | 3900 |

Comparative Examples 1 to 3

Continuous rolls each composed of a carrier film and a pressure-sensitive adhesive layer-carrying polarizing film were obtained under the same conditions as those in Example 1, except that the carrier film was changed as shown in Table 1.

Table 2 shows the evaluation results.

TABLE 2

| No. | Bending rigidity [N·mm$^2$] of carrier film per unit length | Longitudinal elastic modulus [MPa] of carrier film | Thickness [μm] of carrier film | Degree of lifting of carrier film from edge member | Degree of wrinkling or kinking during bonding of carrier film to polarizing film | Rate [%] of occurrence of peeling between pressure-sensitive adhesive and carrier film at end of piece formed by half-cutting | Rate [%] of occurrence of bubbles (the number of occurrences/the number of experiments (100)) | Rate [%] of occurrence of carrier film break (the number of occurrences of break/the number of experiments (100)) | Yield [%] |
|---|---|---|---|---|---|---|---|---|---|
| Example 1 | 8.3 × 10$^{-5}$ | 4000 | 6.3 | None | Low | 0 | 17 | 8 | 75 |
| Example 2 | 5.8 × 10$^{-4}$ | 4000 | 12 | None | None | 0 | 0 | 1 | 99 |

TABLE 2-continued

| No. | Bending rigidity [N·mm²] of carrier film per unit length | Longitudinal elastic modulus [MPa] of carrier film | Thickness [µm] of carrier film | Degree of lifting of carrier film from edge member | Degree of wrinkling or kinking during bonding of carrier film to polarizing film | Rate [%] of occurrence of peeling between pressure-sensitive adhesive and carrier film at end of piece formed by half-cutting | Rate [%] of occurrence of bubbles (the number of occurrences/the number of experiments (100)) | Rate [%] of occurrence of carrier film break (the number of occurrences of break/the number of experiments (100)) | Yield [%] |
|---|---|---|---|---|---|---|---|---|---|
| Example 3 | $5.9 \times 10^{-3}$ | 4500 | 25 | None | None | 0 | 0 | 0 | 100 |
| Example 4 | $1.8 \times 10^{-2}$ | 4000 | 38 | None | None | 0 | 0 | 0 | 100 |
| Example 5 | $4.8 \times 10^{-2}$ | 4600 | 50 | None | None | 0 | 0 | 0 | 100 |
| Example 6 | $2.3 \times 10^{-2}$ | 5000 | 38 | None | None | 0 | 0 | 3 | 97 |
| Example 7 | $3.3 \times 10^{-2}$ | 3200 | 50 | None | None | 2 | 3 | 0 | 97 |
| Comparative Example 1 | $1.4 \times 10^{-1}$ | 3900 | 75 | High | None | 0 | 61 | 0 | 39 |
| Comparative Example 2 | $3.0 \times 10^{-5}$ | 4000 | 4.5 | None | High | 0 | 32 | 15 | 53 |
| Comparative Example 3 | $1.5 \times 10^{-3}$ | 690 | 30 | None | None | 55 | 53 | 0 | 47 |

The results in Table 2 show that in the examples, formation of bubbles was effectively prevented particularly in the bonding process, so that the total yield was successfully improved. Particularly when the carrier film had a thickness of at least 10 µm (Examples 2 to 7), the yield was at least 97% in all cases.

In Comparative Example 1 where the bending rigidity of the carrier film was higher than the upper limit, however, bubbles were easily formed due to the lifting of the carrier film from the edge member. Even in Comparative Example 2 where the bending rigidity of the carrier film was less than the lower limit, bubbles were easily formed due to wrinkling or the like during the bonding. In Comparative Example 3 where the longitudinal elastic modulus of the carrier film is less than the lower limit, bubbles were easily formed due to peeling during the feeding.

DESCRIPTION OF REFERENCE SIGNS

In the drawings, F1 represents a first sheet material, F2 a second sheet material, F11 a first optical functional film, F11a a first polarizer, F11b a first film, F11c a second film, F12 a first carrier film, F13 a surface protecting film, F14 a first pressure-sensitive adhesive layer, F21 a second optical functional film, F21a a second polarizer, F21b a third film, F21c a fourth film, F22 a second carrier film, F23 a surface protecting film, F24 a second pressure-sensitive adhesive layer, 12 a first feeder, 13 a first pre-inspection peeling apparatus, 14 a first defect inspection apparatus, 15 a first carrier film bonding apparatus, 16 a first cutting apparatus, 17 a first peeling apparatus, 18 a first bonding apparatus, 19 a first rejection apparatus, R a feeder, and W a liquid crystal panel.

The invention claimed is:

1. A method for manufacturing a liquid crystal display device, comprising the steps of:
    cutting a belt-shaped optical functional film at a predetermined interval while leaving a carrier film uncut, wherein the carrier film adheres to the belt-shaped optical functional film via a pressure-sensitive adhesive layer;
    peeling off a cut piece of the optical functional film from the carrier film by turning the direction of feeding of the carrier film by means of an edge member; and
    bonding an exposed surface of the cut piece of the optical functional film to a liquid crystal panel while peeling off the cut piece of the optical functional film, wherein
    the carrier film has a bending rigidity of from $5.0 \times 10^{-5}$ N·mm² to $8.0 \times 10^{-2}$ N·mm² per unit length in its longitudinal direction and has a longitudinal elastic modulus of from 3,000 MPa to 5,000 MPa in its longitudinal direction, wherein the bending rigidity per unit length is expressed by the product E×I, wherein E represents the longitudinal elastic modulus [N/mm²] of the optical functional film, and I represents the second moment of area per unit length expressed by I=b×h³/12, wherein b represents unit length (1 mm), and h represents film thickness (mm); and
    a peel strength between the carrier film and the pressure-sensitive adhesive layer is from 0.05 N/50 mm to 0.3 N/50 mm.

2. The method according to claim 1, wherein the belt-shaped optical functional film is drawn from a roll of belt-shaped optical functional film.

* * * * *